G. L. BIGNELL.
LABEL CUTTING AND FOLDING MACHINE.
APPLICATION FILED AUG. 6, 1917.

1,283,055.

Patented Oct. 29, 1918.
9 SHEETS—SHEET 1.

Inventor
George L. Bignell
By Cyrus W. Rice
his Attorney

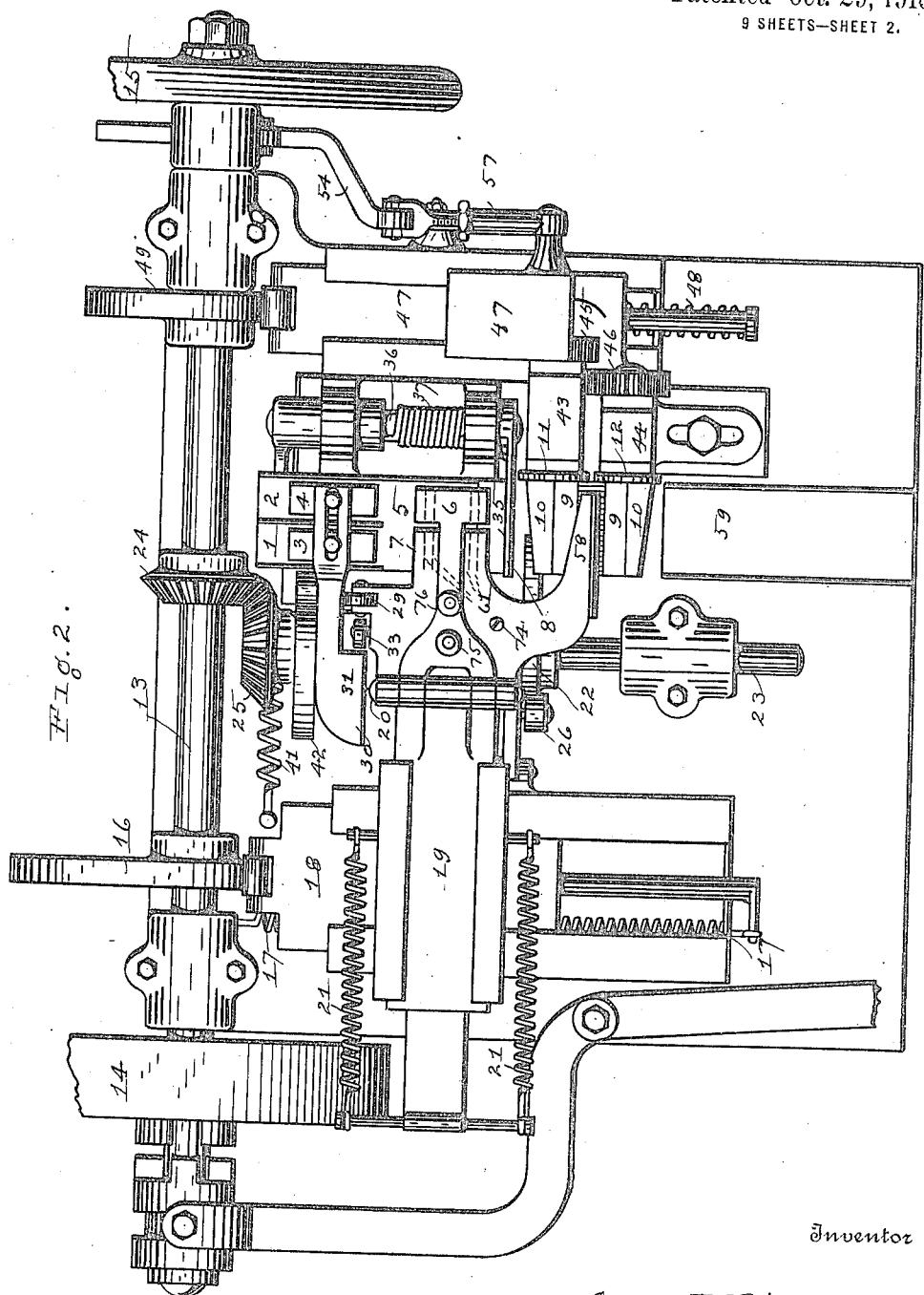

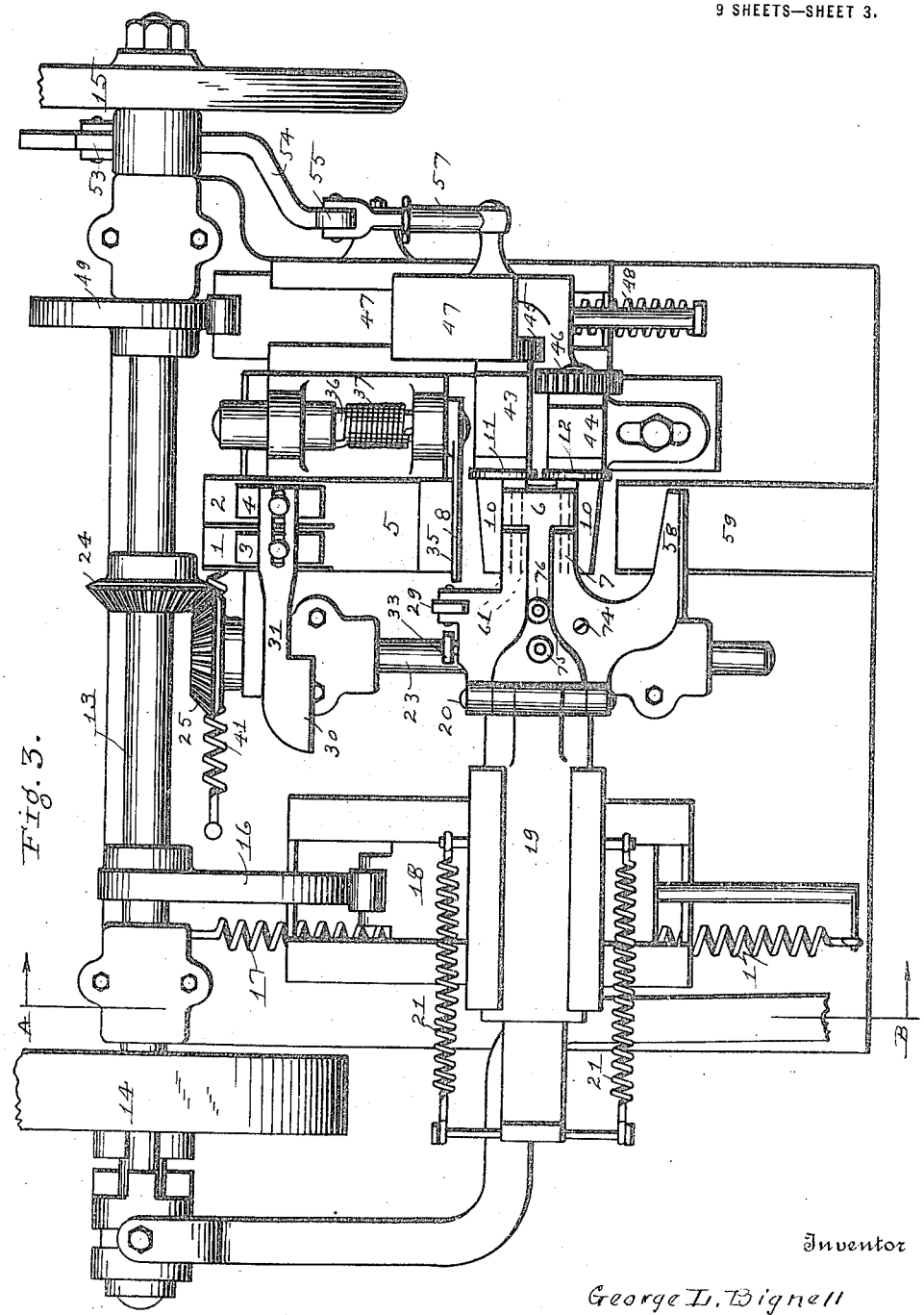

G. L. BIGNELL.
LABEL CUTTING AND FOLDING MACHINE.
APPLICATION FILED AUG. 6, 1917.
1,283,055.
Patented Oct. 29, 1918.
9 SHEETS—SHEET 4.
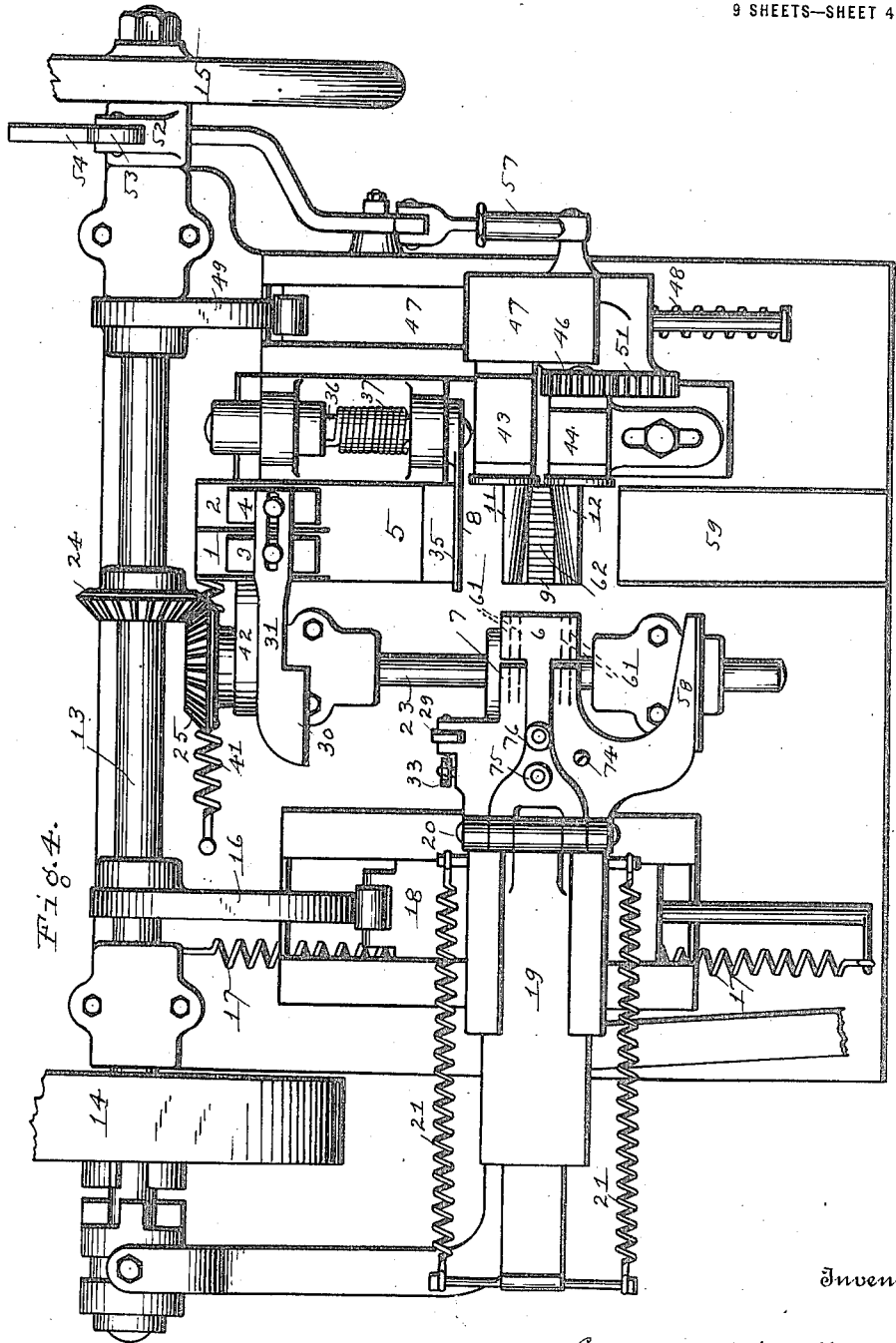
Inventor
George L. Bignell
By Cyrus W. Rice
his Attorney

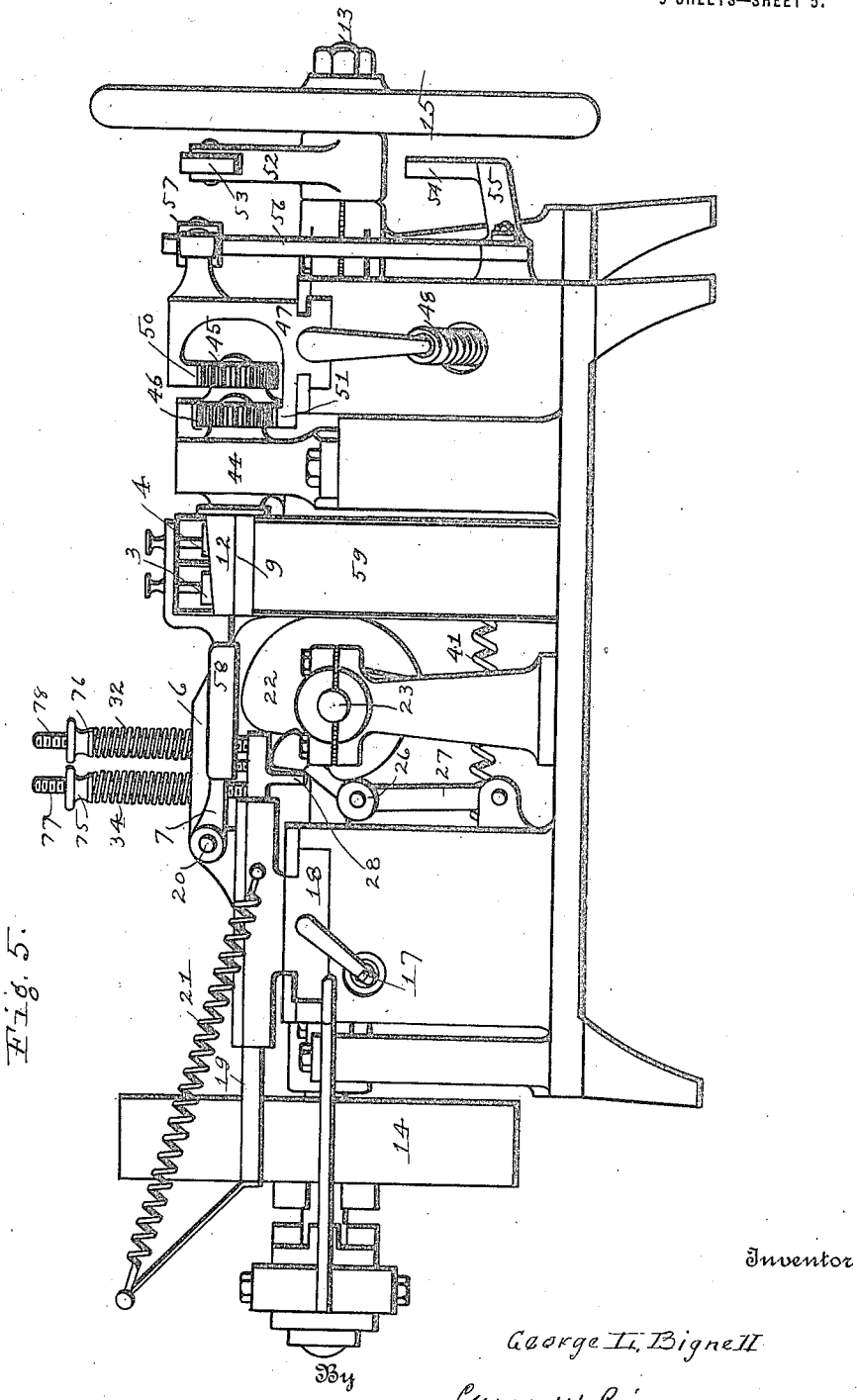

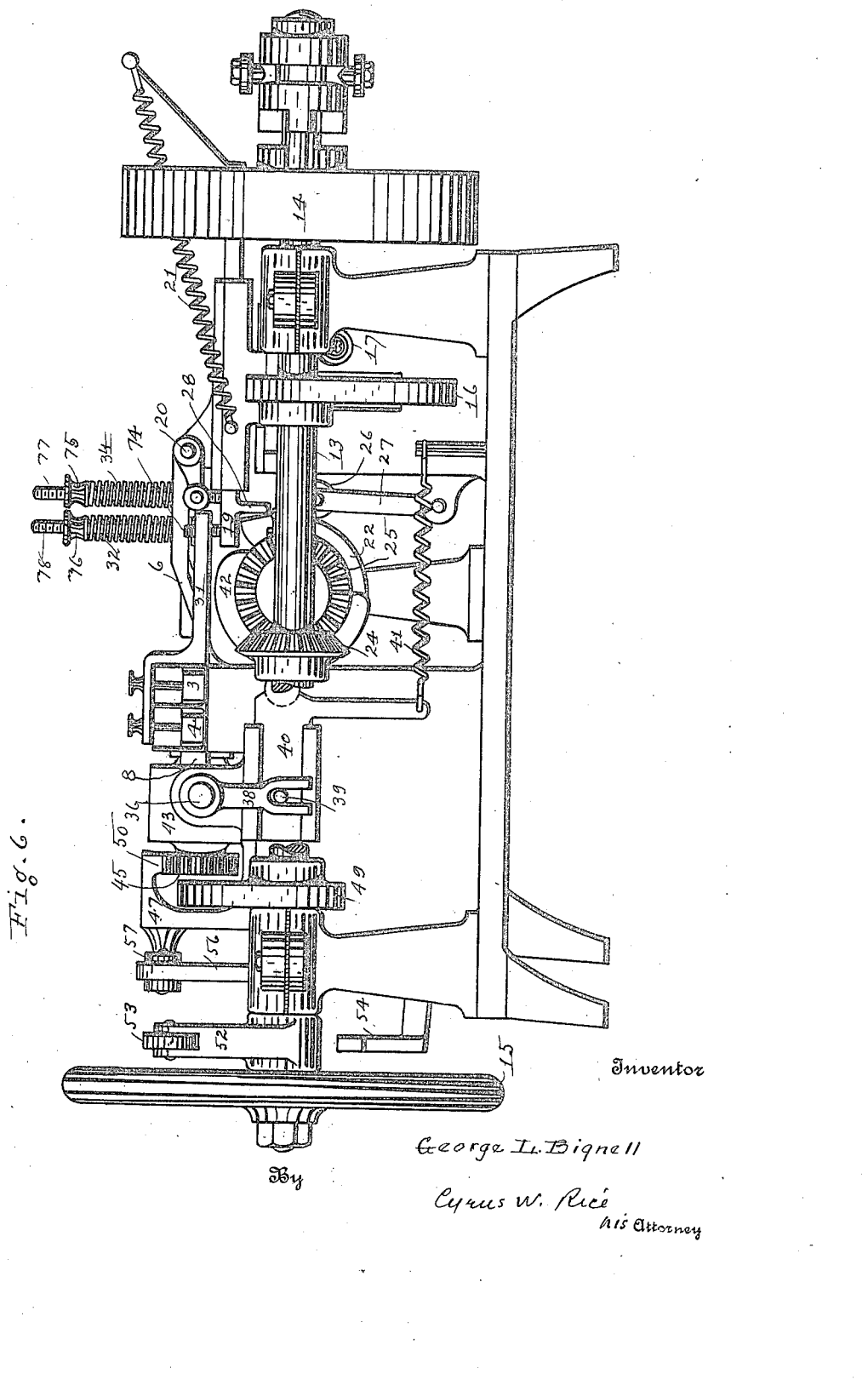

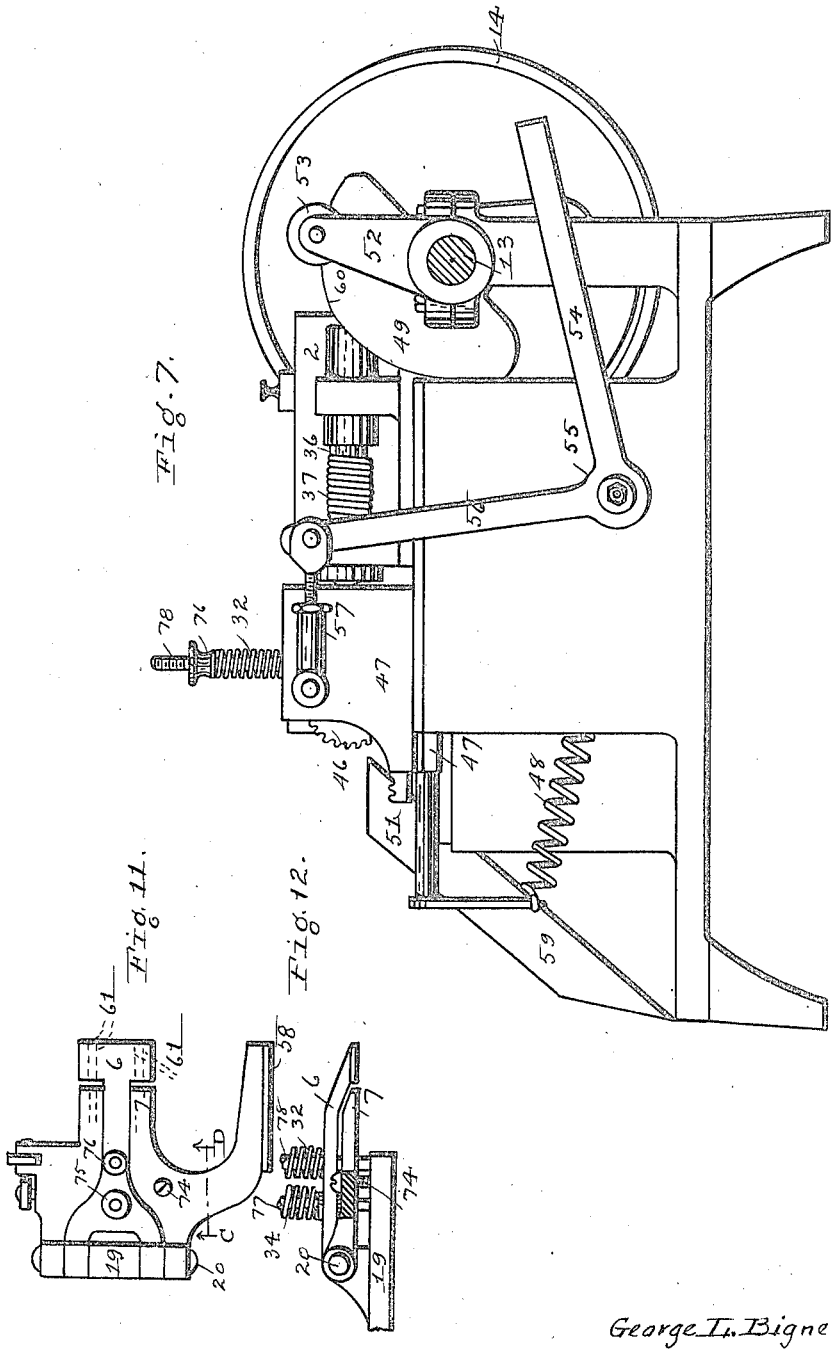

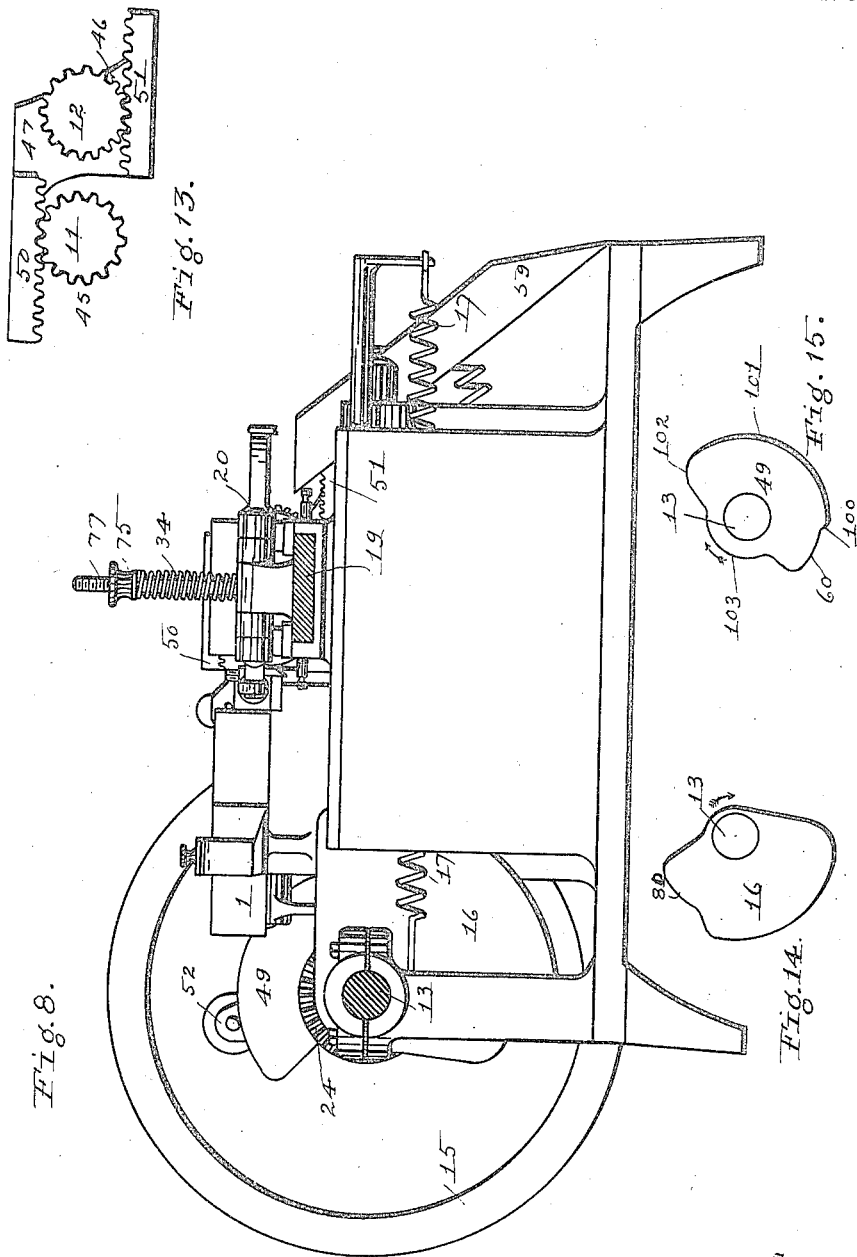

G. L. BIGNELL.
LABEL CUTTING AND FOLDING MACHINE.
APPLICATION FILED AUG. 6, 1917.
1,283,055.
Patented Oct. 29, 1918.
9 SHEETS—SHEET 9.
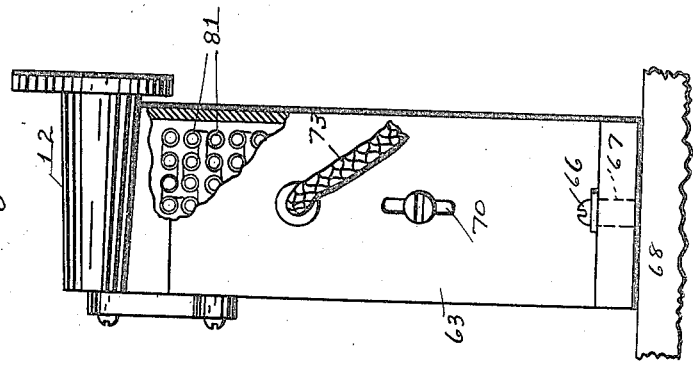
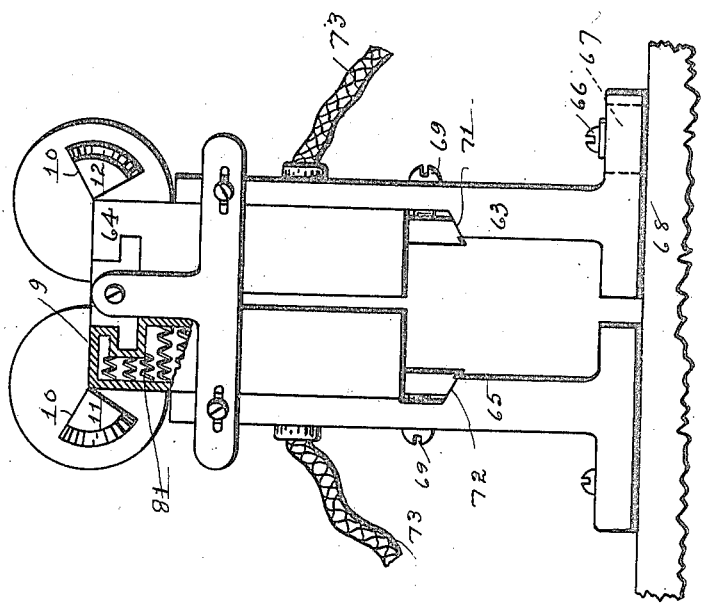
Inventor
George L. Bignell
By Cyrus W. Rice
his Attorney

UNITED STATES PATENT OFFICE.

GEORGE L. BIGNELL, OF GRAND RAPIDS, MICHIGAN, ASSIGNOR TO THE ROSE PATCH AND LABEL COMPANY, OF GRAND RAPIDS, MICHIGAN, A CORPORATION OF MICHIGAN.

LABEL CUTTING AND FOLDING MACHINE.

1,283,055. Specification of Letters Patent. Patented Oct. 29, 1918.

Application filed August 6, 1917. Serial No. 184,629.

*To all whom it may concern:*

Be it known that I, GEORGE L. BIGNELL, a citizen of the United States, residing at Grand Rapids, in the county of Kent and State of Michigan, have invented new and useful Improvements in Label Cutting and Folding Machines, of which the following is a specification.

The present invention relates to label cutting and folding machines, and its object is generally, to provide a very simple and economical but efficient machine of that character; and more particularly, to provide in such a machine a label-strip feeder whereby the strip is pressed on a table and is slipped along the surface of the same to the folder; and further, to provide in such a machine a folder whereby the ends of the severed label-lengths are folded over a form by a turning movement of the folder without its sliding along or rubbing the material; and further, to provide such a movable feeder which shall itself be the form over which the ends of the label-lengths are folded; and further, to provide particular mechanisms whereby such objects may be well accomplished. These and any other objects hereinafter appearing, including objects relating to economies of construction and arrangement, are attained by, and the invention finds preferable embodiment in, the structure hereinafter described and illustrated by the accompanying drawings, in which:—

Fig. 2 is a like view showing the parts in a later position;

Fig. 3 is a like view illustrating the parts in a still later position;

Fig. 4 is a like view showing the parts in a still later position in the machine's cycle of movement;

Fig. 5 is a front view of said machine;

Fig. 6 is a rear view of the same;

Fig. 7 is a right-hand end view of said machine with the hand wheel removed;

Fig. 8 is a sectional view of the same taken on a vertical plane corresponding to line A—B of Fig. 3;

Fig. 9 is an end view of label folding means and mountings, etc.;

Fig. 10 is a side view of the same;

Fig. 11 is a top plan view of the feeders;

Fig. 12 is a sectional view of the same taken on a vertical plane corresponding to line C—D of Fig. 11;

Fig. 13 is a view of the folder's gears and the racks for operating the same; and Figs. 14 and 15 show two of the cams.

Figure 1:
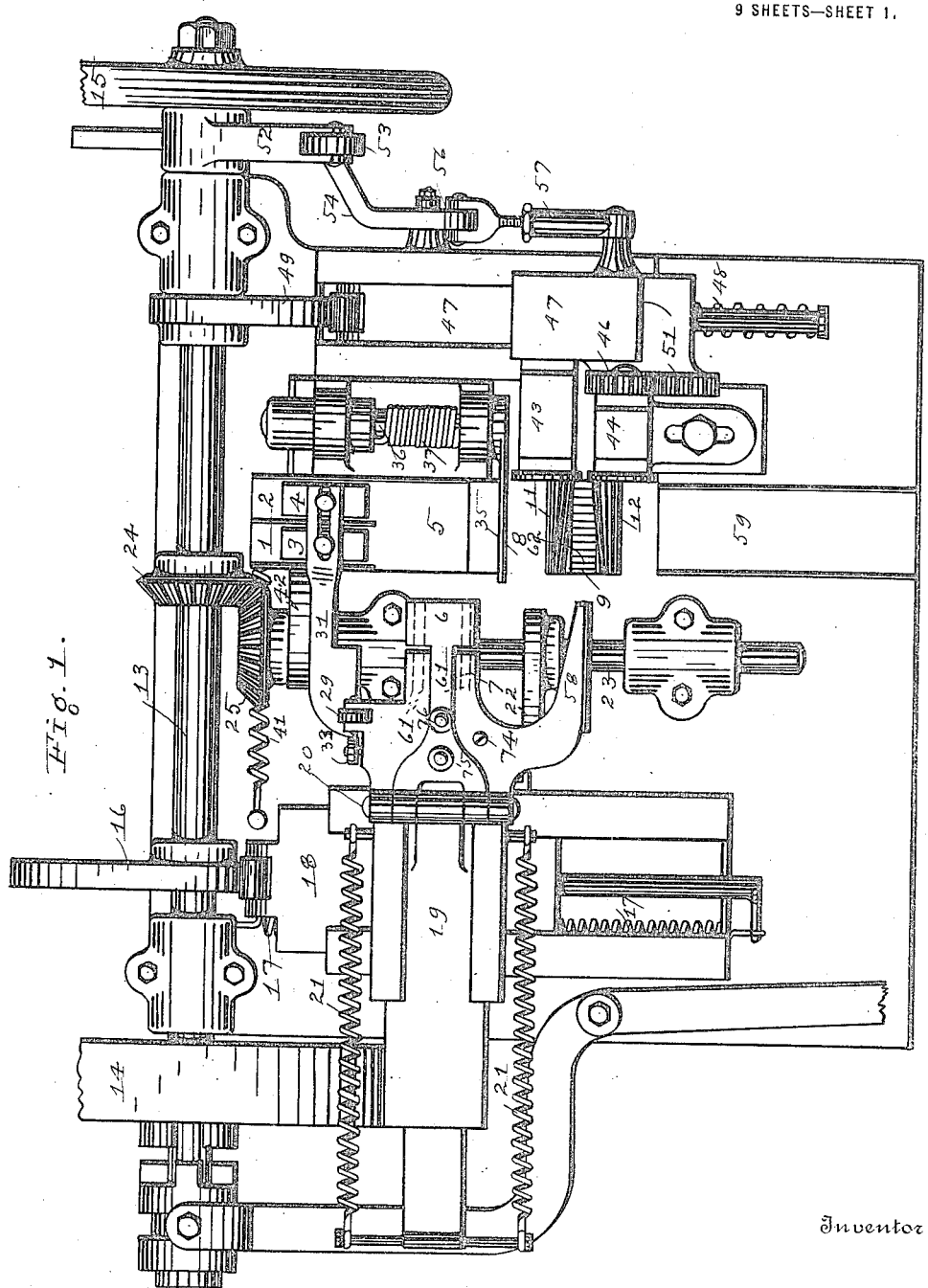
Figure 1 is a plan view of a label cutting and folding machine, showing the parts at the beginning of its cycle of movement.

In the embodiment of the invention chosen for illustration by the drawings and for detailed description, in the body of this specification, a plurality of label strips (two in the particular machine shown) may be operated on simultaneously, one strip being fed along the guide 1 and the other along the parallel guide 2, under weights 3, 4, and onto a horizontal table 5. The strip feeders 6, 7 are moved toward and descend on the strips respectively (as hereinafter explained), pressing them on the table. These feeders then move toward the bottom of Figs. 1, 2, 3 and 4, carrying the strips with them, the strips slipping along the table's surface, and feed them past the swinging cutter 8 (which is now in raised position) and onto the bed 9 and the radial faces 10 of the turnable folders 11, 12, axially parallel with the bed's face, said radial faces now lying in the plane of the bed's face as shown in Fig. 2. These folders are now turned about half a revolution, thus bending or folding the ends of the two label-lengths (which have just been severed from the strips by the cutter) over and around the opposite edges of the feeders, as a form, the feeders thus constituting combined feeding and form members. The turning of the folders is now halted momentarily while the feeders are withdrawn longitudinally from the bed and the folders, to the position shown in Fig. 4, leaving the folded labels between the folders and the bed. The folders' turning movement is now resumed and continued a little farther, whereby the folded ends of the labels are pressed directly on the body portion of the labels.

These movements of the parts are effected in the construction shown by the following mechanism: The shaft 13 having a suitable driving pulley 14 and hand wheel 15, carries a cam 16 for imparting the feeding movement to the feeders by pushing, against the pressure of a spring 17, a reciprocating primary carriage 18. A reciprocating secondary carriage 19 on which the feeders are severally mounted pivotally at 20 on a horizontal axis, is slid in guides on the primary carriage against the pressure of springs 21 away from the bed and folders by a cam 22 on the shaft 23 rotated by the bevel gears 24, 25, said cam engaging the roll 26 on the lever 27 whose free end bears against the bar 28 of the secondary carriage, such bar sliding along said free end during the travel of the primary carriage. (Figs. 5 and 6.) When, by the action of the spring 17 on the primary carriage, the secondary carriage reaches its position shown in Fig. 1, the roll 29 on the feeder 7 rides up a slight incline 30 on the fixed bar 31 and raises said feeder and the overlying feeder 6 against the pressure of their respective springs 32, 34, and thereupon the cam 22 turning from its high portion, the springs 21 press the secondary carriage toward the table, the roll 33 on the feeder 7 riding on said bar, the feeders being thus sufficiently elevated to clear the strips lying on the table. As the roll 33 rides off the end of the bar, the feeders descend and press on the strips, being now in the position shown in Fig. 2. The cam 16 now pushes the primary carriage and feeders to feed the strips a label-length past the raised cutter and onto the bed. The cutter now descends and with its coöperating fixed blade 35 severs a pair of label-lengths from the strips. This cutter is a shear blade carried on the shaft 36 rocked against the pressure of the spring 37 by its arm 38 bifurcated as shown in Fig. 6 to engage a pin 39 on the slide 40 which is moved to operate the cutter and against a spring 41 by a cam 42 on the shaft 23.

The folders are now operated by the following means: They are turnably mounted in bearing blocks 43, 44 and are provided with gears 45, 46 respectively. A reciprocating bar 47 moved against a spring 48 by the cam 49 carried by the shaft 13 is provided with a rack 50 above and meshing with the gear 45 and a second rack 51 below and meshing with the gear 46, so that the gears and folders are turned about half a revolution in opposite directions by every movement of the rack bar. The action of the spring 48 is supplemented and the rack bar positively returned when the cam 49 turns from its high portion, by an arm 52 on the shaft 13 engaging through its roller 53 with one leg 54 of the bell-crank lever 55 whose other leg 56 is connected by an adjustable link 57 to the rack bar, as shown in Fig. 7. A dwell 60 in the cam 49 (Fig. 15) halts the turning of the folders momentarily while the feeders are being withdrawn from the labels, whereupon the cam turning past said dwell, the folder's movement is resumed by said cam's portion 100 pressing the folded ends directly on the body of the labels, such pressure being maintained continuously by the cam's dwell 101. The folders are released by the cam's portion 102 and are held in their position shown in Fig. 2 by the cam's dwell 103. As the feeders are feeding the strips to the folders, a finger 58 carried by one of the feeders engages and removes from the bed the two labels which have been folded by the last operation of the machine, sweeping them into a chute 59. The feeders are provided on their under sides with means adapted to operatingly engage the strips in the feeding thereof and to release them in the withdrawing movement of the feeders; and the bed is provided with means on its face adapted to hold the labels against movement by such withdrawal of the feeders; said means as shown being respectively ridges 61 (shown in dotted lines) on the feeders' under sides and extending transversely to the feeding movement, and ridges 62 on the face of the bed extending in the direction of said movement. The bed may be shortened or lengthened to adapt the machine to folding labels of different lengths, by moving the support 63 of one portion 64 of the bed toward or away from the support 65 of the other part of the bed, and clamping the movable support by a screw 66 extending through a slot 67 in said support and threaded in the frame 68, as shown in Fig. 9; and the height of the bed may be adjusted by the screws 69 passing through slots 70 in the supports and threaded in said parts of the bed respectively, said parts having inclined bearings at 71, 72 on their supports, as shown in Fig. 9. The bed is shown heated by suitable electric heating coils 81 inside the bed, and having the electric wires 73, so that the folded ends of the labels are ironed down on their bodies by the folding operation.

The height of the feeders may be adjusted by a screw 74 threaded in the under feeder 7 and abutting against the secondary carriage's upper surface; and the tension of the springs 32, 34 may be adjusted by the nuts 75, 76 threaded on the screw posts 77, 78 mounted on said carriage.

It will be seen that the ends of the label-lengths are folded over the form uniformly, and that the folders do not slide along or rub the material during their folding operation.

The invention being intended to be defined by the claims, is not to be limited to or by details of construction shown or described.

What is claimed is:

1. In a machine of the character described; a table; a bed; a cutter between the table and the bed; a feeder and form member adapted to press a strip on the table and to feed it along the table and past the cutter and onto the bed, and having a movement toward the table, a movement for effecting such feeding, a movement from the bed and a movement to initial position; means for raising said member and for permitting it to fall on the strip; a pair of turnable folders on opposite sides of the bed, each having a radial face, said radial faces being adapted to fold by the folders' turning movement the ends of a label-length on the bed over said member; means for turning the folders.

2. In a machine of the character described; a table, a bed; a cutter between the table and the bed; a feeder and form member adapted to press a strip on the table and to feed it along the table and past the cutter and onto the bed, and having a movement toward the table, a movement for effecting such feeding, a movement from the bed and a movement to initial position; means for raising said member and for permitting it to fall on the strip; a pair of turnable folders on opposite sides of the bed, each having a radial face, said radial faces being adapted to fold by the folders' turning movement the ends of a label-length on the bed over said member; means for turning the folders; a finger carried by said member and adapted to remove a folded label from the bed.

3. In a machine of the character described; a table; a bed; a cutter between the table and the bed; a feeder and form member adapted to press a strip on the table and to feed it along the table and past the cutter and onto the bed, and having a movement toward the table, a movement for effecting such feeding, a movement from the bed and a movement to initial position; means for raising said member and for permitting it to fall on the strip; a pair of turnable folders on opposite sides of the bed, each having a radial face, said radial faces being adapted to fold by the folders' turning movement the ends of a label-length on the bed over said member; means for turning the folders; means for heating the bed.

4. In a machine of the character described; a table; a cutter; a feeder and form member adapted to press a strip on the table and to feed it along the table and past the cutter to the folder hereinafter named, and having a movement toward the table, a movement for effecting such feeding, a movement from the folder and a movement to initial position; a folder adapted to fold the end of the strip over said member.

5. In a machine of the character described; a table; a cutter; a feeder and form member adapted to press a strip on the table and to feed it along the table and past the cutter; a folder adapted to fold the end of the strip over said member.

6. In a machine of the character described; a table; a folder; a cutter between the table and the folder; a feeder and form member adapted to press a strip on the table and to feed it along the table and past the cutter to the folder, and having a ridge extending transversely to its feeding movement and adapted to engage the strip.

7. In a machine of the character described; a feeder and form member; a bed having means adapted to hold a strip against movement transverse to its feeding operation; a folder adapted to fold the end of the strip on the bed over said member.

8. In a machine of the character described; a feeder and form member; a bed having a ridge extending in the feeding direction of the feeder and adapted to hold a strip against movement transverse to its feeding direction; a folder adapted to fold the end of a strip on the bed over said member.

9. In a machine of the character described; a non-collapsible form; a bed; a cutter adapted to sever a label from a strip; a turnable folder having a radial face adapted to fold by the folder's turning movement the ends of a severed label on the bed over the form.

10. In a machine of the character described; a form; a bed; a turnable folder adapted to fold by the folder's turning movement the end of a strip on the bed over the form; means for heating the bed.

11. In a machine of the character described; a bed; a feeder and form member adapted to feed a strip onto the bed; a turnable folder having a radial face adapted to fold by the folder's turning movement the end of the strip on the bed over said member.

12. In a machine of the character described; a bed; a feeder and form member adapted to feed a strip onto the bed; a turnable folder having a radial face adapted to fold by the folder's turning movement the end of the strip on the bed over said member; means for heating the bed.

13. In a machine of the character described; a non-collapsible form; a bed; a pair of turnable folders on opposite sides of the bed, each having a radial face, said radial faces being adapted to fold by the folders' turning movement the ends of a label-length on the bed over the form, the folders being provided with gears; and movable racks meshing with the gears to turn the folders in opposite directions.

14. In a machine of the character described; a non-collapsible form; a bed; a cutter adapted to sever a label from a strip; a turnable folder adapted to fold the ends of a severed label on the bed over the form.

In testimony whereof I have hereunto set my hand at Grand Rapids, Michigan this third day of August 1917.

GEORGE L. BIGNELL.